(12) United States Patent
Belt et al.

(10) Patent No.: US 10,836,391 B1
(45) Date of Patent: Nov. 17, 2020

(54) METHODS AND SYSTEM FOR CONTROLLING ENGINE COMPRESSION BRAKING IN A VEHICLE WITH A CONTINUOUSLY VARIABLE TRANSMISSION

(71) Applicant: Ford Global Technologies, LLC, Dearborn, MI (US)

(72) Inventors: Bryan Whitney Belt, Troy, MI (US); Carol Okubo, Dearborn, MI (US); Craig Lechlitner, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/415,223

(22) Filed: May 17, 2019

(51) Int. Cl.
| | |
|---|---|
| *B60W 30/18* | (2012.01) |
| *B60W 50/038* | (2012.01) |
| *B60W 20/13* | (2016.01) |
| *F16H 61/662* | (2006.01) |

(52) U.S. Cl.
CPC ...... *B60W 30/18109* (2013.01); *B60W 20/13* (2016.01); *B60W 50/038* (2013.01); *F16H 61/66231* (2013.01)

(58) Field of Classification Search
None
See application file for complete search history.

(56) References Cited

U.S. PATENT DOCUMENTS

| | | | | |
|---|---|---|---|---|
| 5,514,050 | A | * | 5/1996 | Bauerle ............ F16H 61/66259 477/118 |
| 5,806,642 | A | * | 9/1998 | Harada .............. F16H 61/0021 192/218 |
| 6,033,338 | A | | 3/2000 | Jackson et al. |
| 7,072,754 | B1 | * | 7/2006 | Sherrod ............. B60W 10/103 477/44 |
| 9,050,951 | B2 | * | 6/2015 | Suzuki ...................... B60T 8/17 |
| 10,407,069 | B2 | * | 9/2019 | Okubo ................. B60W 10/08 |
| 10,408,343 | B2 | * | 9/2019 | Tatangelo ................ F16H 9/18 |
| 2003/0168266 | A1 | * | 9/2003 | Sasaki ....................... B60L 7/26 180/65.25 |
| 2007/0252432 | A1 | * | 11/2007 | Takamatsu ............... B60T 8/00 303/167 |
| 2014/0200777 | A1 | | 7/2014 | Dufford |
| 2015/0066316 | A1 | | 3/2015 | Fujii et al. |
| 2018/0304895 | A1 | | 10/2018 | Okubo et al. |

\* cited by examiner

*Primary Examiner* — Dirk Wright

(74) *Attorney, Agent, or Firm* — David Kelley; McCoy Russell LLP

(57) ABSTRACT

Methods and systems are provided for operating a continuously variable transmission (CVT) of a driveline of a vehicle during a request for engine compression braking. In one example, a method may include, responsive to an engine compression braking request, operating a CVT via a controller to adjust engine speed according to an engine speed-to-vehicle speed profile selected based on a power-based target engine speed for the engine compression braking request. The power-based target engine speed may vary continuously with driver demanded power and a battery charge power limit of the vehicle.

20 Claims, 6 Drawing Sheets

METHODS AND SYSTEM FOR CONTROLLING ENGINE COMPRESSION BRAKING IN A VEHICLE WITH A CONTINUOUSLY VARIABLE TRANSMISSION

FIELD

The present description relates generally to methods and systems for operating a powertrain of a vehicle that includes a continuously variable transmission (CVT) and a motor.

BACKGROUND/SUMMARY

A vehicle may include a continuously variable transmission (CVT) to improve vehicle fuel economy and reduce vehicle weight. In particular, in a powersplit hybrid vehicle, the CVT may allow a disconnect between vehicle speed and engine speed so that the most efficient engine operating point may be chosen for a range of vehicle operating conditions, thereby increasing fuel economy and reducing emissions. In some examples, the CVT may take the form of a planetary gear set and a generator. Torque of the generator may be adjusted so that engine speed may be controlled independent of wheel speed. Engine torque and torque of a motor positioned downstream of the generator in a vehicle driveline may be used to propel the vehicle when driver demand is high. Conversely, at least a portion of the vehicle's kinetic energy may be transferred through the planetary gear set and to the engine via adjusting a torque of the generator when driver demand is low and engine braking is requested. Engine compression braking may be used to produce negative wheel torque in order to meet a negative driver demand (e.g., during a deceleration or braking event) when regenerative braking alone cannot fulfil the negative torque request. For example, when the battery (connected to the motor) cannot accept the power required for producing the requested negative wheel torque, such as when the battery charge limit is low, compression braking may be requested. Thus, the compression braking power request may be based on the driver demanded deceleration power and the battery charge power limit. During compression braking, engine fueling may be disabled, and the generator spins the engine and the power consumed by the generator depends on the engine speed achieved and the engine friction and pumping losses (which vary based on engine speed, among other factors).

However, when a CVT is transferring torque from vehicle wheels to an engine to utilize engine braking, driveline noise and vibration (NVH) may increase to undesirable levels. Thus, to reduce NVH, engine compression braking may be controlled according to a series of engine compression braking curves that are a function of vehicle speed. Each curve may be calibrated as a different fixed gear ratio, in one example. One such approach is shown by Okubo et al in U.S. patent application publication no. 2018/0304895. Therein, methods are disclosed for adjusting engine speed according to a plurality of engine speed-to-vehicle speed profiles and switching the engine speed-to-vehicle speed profile for controlling the CVT based on vehicle speed and brake pedal position. In particular, the method includes switching the engine speed-to-vehicle speed profile based on a vehicle speed error between a current vehicle speed and a desired vehicle speed.

However, the inventors herein have recognized potential issues with such methods and systems. As one example, changing the engine speed-to-vehicle speed profile for adjusting engine speed based on vehicle speed during an engine compression braking event may not deliver the demanded power-based compression braking engine speed. For example, the demanded or target power-based compression braking engine speed during compression braking may be determined based on the wheel power demand (e.g., the driver demanded deceleration power) and the battery charge power limit of the battery of the driveline of the hybrid vehicle. Since the engine speed varies continuously with wheel power demand and charge limit while in compression braking, adjusting engine speed according to engine speed-to-vehicle speed profiles selected based on vehicle speed and/or brake pedal position or accelerator position alone may result in the vehicle not decelerating at the demanded rate. Further, the desired vehicle speed may not be available under all operating modes of the vehicle (e.g., may only be available in grade assist or cruise control modes) and switching between profiles may only be possible when the accelerator pedal is fully released.

In one example, the issues described above may be addressed by a method for a vehicle, comprising: in response to a request for engine compression braking of a vehicle, operating a continuously variable transition (CVT) via a controller to adjust engine speed according to an engine speed-to-vehicle speed profile selected based on a power-based target engine speed for the compression braking request, the power-based target engine speed varying continuously with driver demanded deceleration power and a battery charge power limit of the vehicle.

As one example, the engine speed-to-vehicle speed profile may be one of a plurality of stored engine speed-to-vehicle speed profiles. By adjusting engine speed via a CVT according to one of a plurality of engine speed-to-vehicle speed profiles that are selected based on a power-based target engine speed for the compression braking request, it may be possible to provide a desired level of engine braking, while also reducing NVH. For example, if the current compression braking level is too low to deliver the requested compression braking power, the delivered wheel power (and torque) may be less than driver demand since the battery power is being limited by the battery charge power limit. As a result, vehicle speed may increase downhill, thereby increasing the driver demanded power. As the amount of compression braking power requested increases, the power-based target engine speed will also increase. When the power-based target engine speed for compression braking increases above a threshold to shift to the next, higher engine speed-to-vehicle speed profile, the commanded engine speed will change to the next, higher level for the current vehicle speed. This will increase the amount of compression braking power delivered, and the delivered wheel power will no longer be constrained by the battery charge limit. The delivered wheel torque will thereby drop to the requested wheel power. By shifting between the different engine speed-to-vehicle speed profiles based on driver-demanded deceleration power (e.g., desired wheel power), which is always available, shifting may be performed under all conditions and operating modes of the vehicle. Further, the shifting between profiles may also occur when the accelerator is depressed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
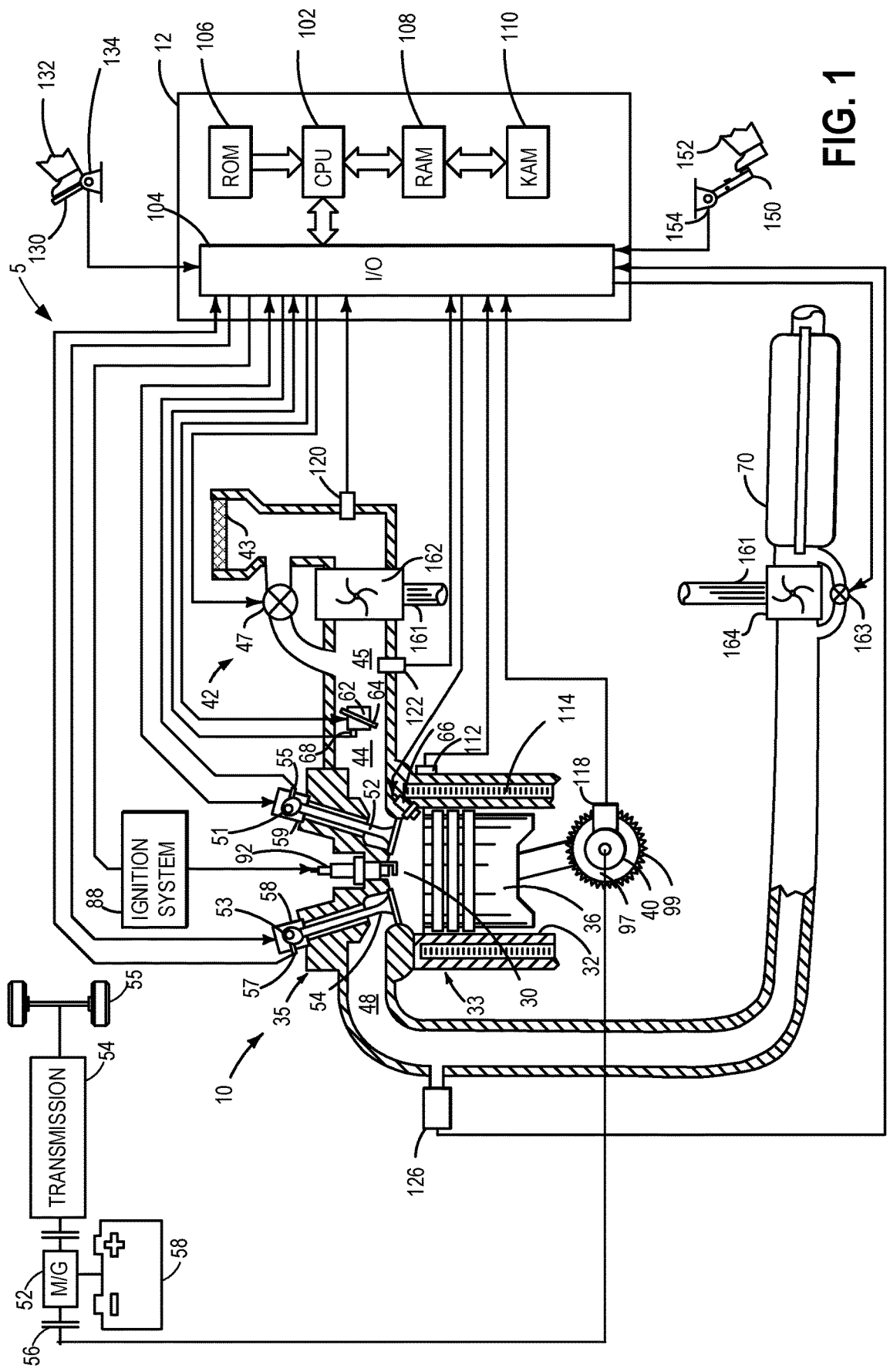
FIG. 1 is a schematic diagram of an engine.
Figure 2:
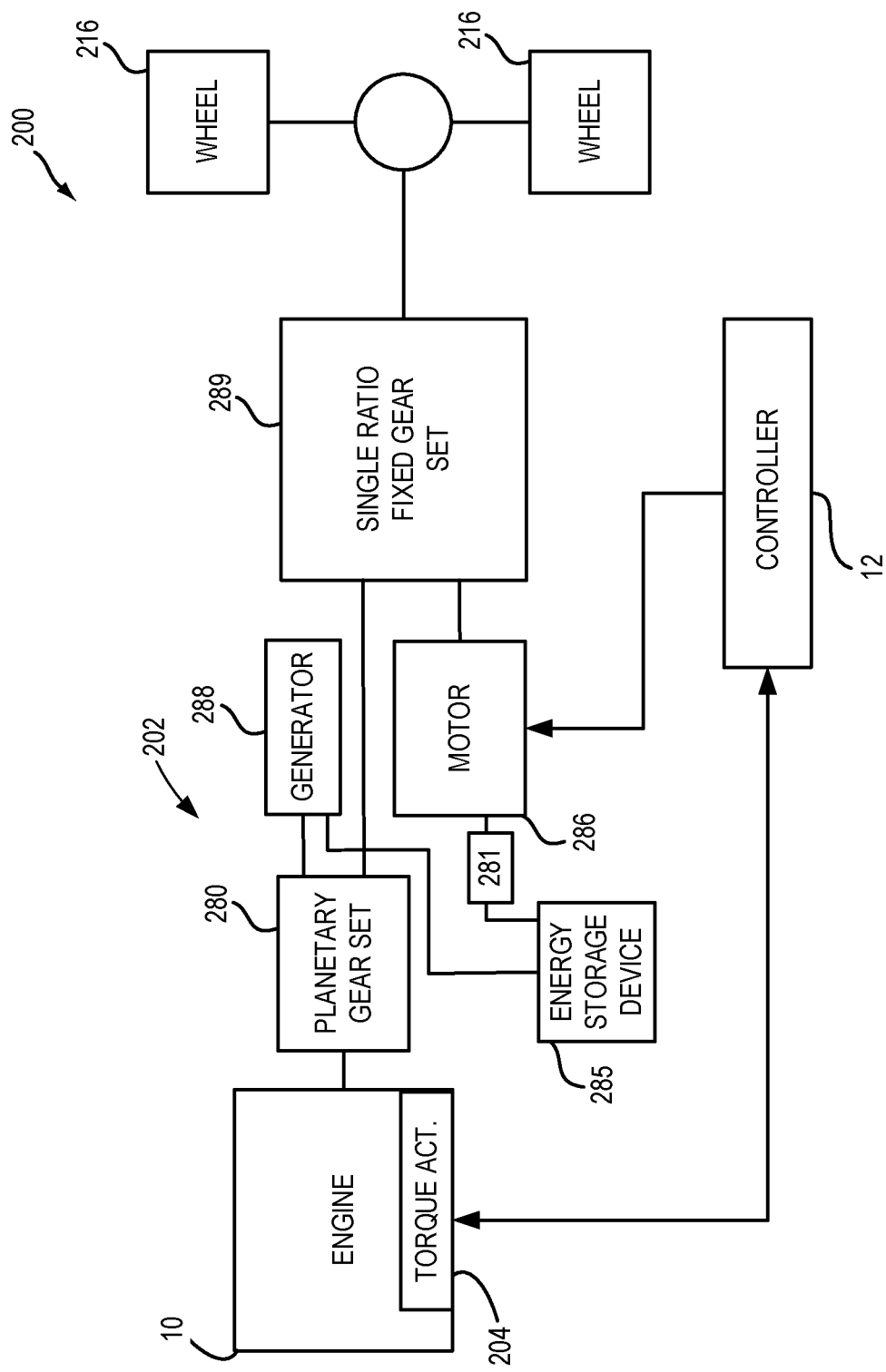
FIG. 2 is a schematic diagram of an example vehicle driveline.
Figure 3:
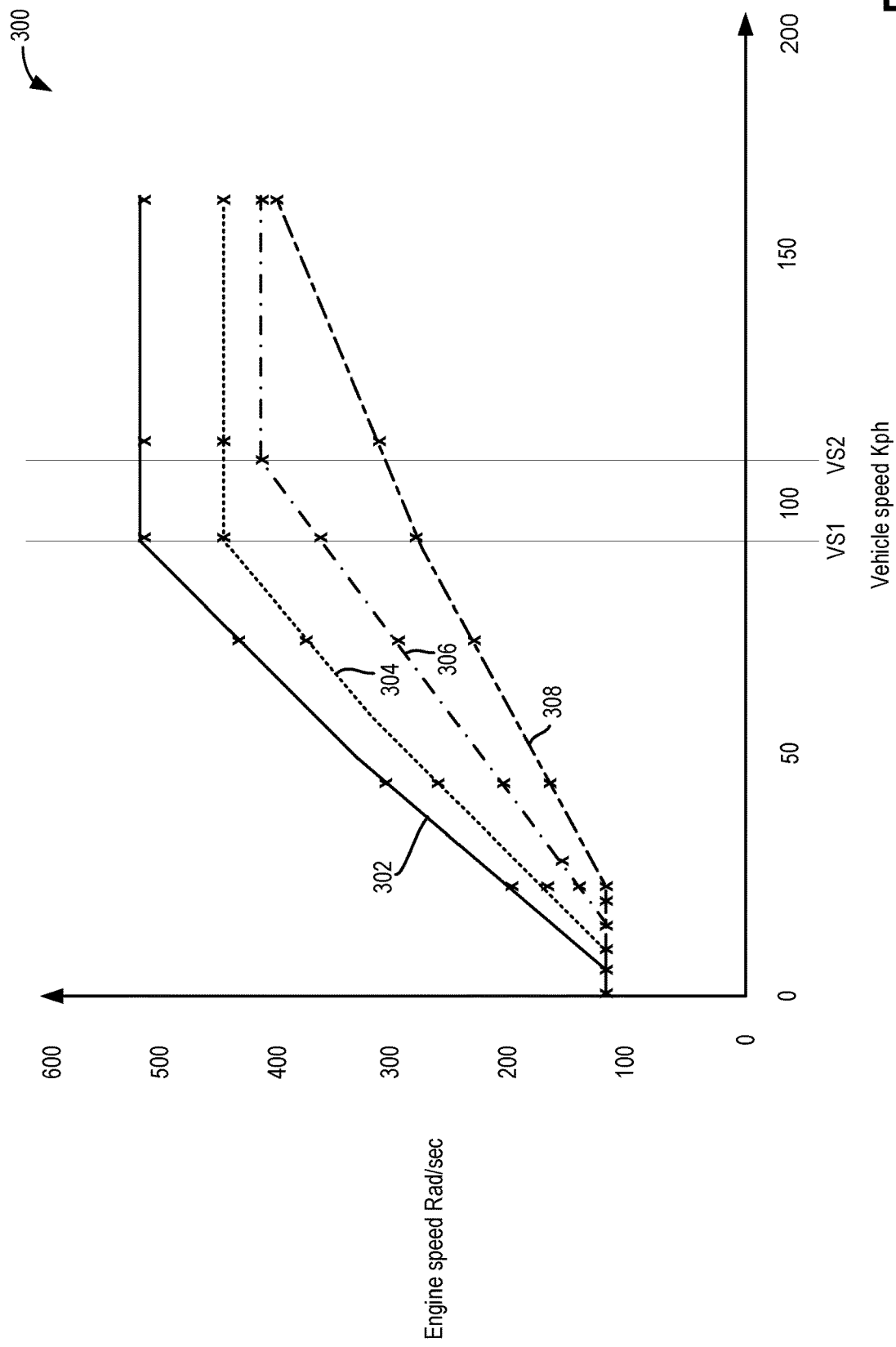
FIG. 3 shows example CVT engine speed-to-vehicle speed profiles that provide a basis for adjusting a CVT input to output ratio.

The following description relates to systems and methods for operating a continuously variable transmission (CVT) of a driveline of a vehicle. The driveline may include an engine, CVT, motor, and energy storage device (e.g. battery). The vehicle's engine may be configured as is shown in FIG. 1. The engine of FIG. 1 may be included in a driveline, such as the driveline shown in FIG. 2. As shown in FIG. 2, the CVT may take the form of a planetary gear set and generator. The CVT may be operated to provide engine speeds according to one of a plurality of engine speed-to-vehicle speed profiles, as shown in FIG. 3. As shown by the example method of FIG. 4, during an engine compression braking request, engine speed may be delivered according to one of the engine speed-to-vehicle speed profiles which are selected based on a power-based target engine speed. The power-based target engine speed may be based on wheel power demand (and wheel torque request) and a battery charger power limit of the battery. In particular, when the power-based target engine speed, which varies continuously with wheel power demand and charge limit, increases above or decreases below a respective threshold level for the currently selected engine speed-to-vehicle speed profile, the selected profile is shifted to the next, higher or lower, respectively, profile, thereby changing the commanded engine speed to the next, higher or lower level. An example of such shifting based on power-based target engine speed thresholds is shown in the graph presented in FIG. 5. As shown by the example operating sequence presented in FIG. 6, shifting to the next higher or lower profiles in this way may allow for the demanded wheel power to be delivered.

Referring to FIG. 1, internal combustion engine 10 of vehicle 5, comprising a plurality of cylinders, one cylinder of which is shown in FIG. 1, is controlled by electronic engine controller 12. Engine 10 is comprised of cylinder head 35 and block 33, which includes combustion chamber 30 and cylinder walls 32. Piston 36 is positioned therein and reciprocates via a connection to crankshaft 40. Flywheel 97 and ring gear 99 are coupled to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Opening and closing time of intake valve 52 may be moved relative to a position of crankshaft 40 via valve phase adjusting device 59. Similarly, opening and closing time of exhaust valve 54 may be moved relative to a position of crankshaft 40 via valve phase adjusting device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12.

In one aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle. For example, transmission 54 may be a continuously variable transmission (CVT), such as the CVT shown in FIG. 2, as described further below.

Electric machine 52 receives electrical power from a traction battery 58 to provide torque to vehicle wheels 55. Electric machine 52 may also be operated as a generator to provide electrical power to charge battery 58, The controller 12 receives signals from the various sensors of FIG. 1 and employs the various actuators of FIG. 1 to adjust engine operation based on the received signals and instructions stored on a memory of the controller. For example, adjusting engine speed may include adjusting an actuator of a generator of a CVT, adjusting an actuator of a throttle to adjust airflow to cylinders of the engine, and/or adjusting an actuator of a fuel injector to adjust fueling delivered to cylinders of the engine.

FIG. 2 is a block diagram of a vehicle including a powertrain or driveline 200. Driveline 200 includes engine 10 and controller 12, as described above with reference to FIG. 1. Controller 12 may send torque requests to a torque actuator 204 of the engine which may include an actuator of one or more fuel injectors and the intake throttle, in order to adjust air and fueling provided to the engine, in order to deliver the desired engine torque request.

Driveline 200 includes a CVT 202 in the form of planetary gear set 280 and generator 288. Engine 10 provides torque to planetary gear set 280 and generator 288 may operate in a speed control mode whereby torque of generator 288 is adjusted to control speed of engine 10 to a desired speed via planetary gear set 280. Engine torque output from planetary gear set 280 may be supplied to single ratio gearing system 289. Electrical output from generator 288 provides electrical energy to energy storage device 285 and motor 286. Electrical energy storage device 285 may supply electrical power to motor 286 via variable voltage controller 281 when engine 10 is not operating. Electrical energy storage device 285 may be a battery, capacitor, or other electrical energy storage device, and electrical energy storage device 285 may be selectively electrically coupled to stationary power grid (not shown). During some conditions, motor 286 may also be operated in a generator mode for regenerative braking. Torque from engine 10 and motor 286 may be combined in single ratio gearing system 289 to provide torque to vehicle wheels 216 via a mechanical power path. Controller 12 controls operation of engine 10, generator 288, and motor 286 to adjust power supplied to vehicle wheels 216. Thus, the driveline of FIG. 2 does not include a transmission with multiple fixed gear ratios for delivering engine and motor power to vehicle wheels.

Speed of engine 10 may be adjusted to a speed that is independent of a speed of motor 286 and wheels 216 such that driveline 200 operates as a CVT that is electrically controlled via adjusting a torque of generator 288. In particular, an actual total number of engine turns provided to the planetary gear set to an actual number of turns input to the single ratio gear set or vehicle wheels (e.g., CVT ratio) may be adjusted via adjusting torque of generator 288.

In one example, engine 10 is mechanically coupled to a planetary carrier of planetary gear set 280. Generator 288 is mechanically coupled to a sun gear of the planetary gear set 280, and a ring gear of the planetary gear set 280 is mechanically coupled to single ratio gear set 289. Motor 286 is also coupled to single ratio gear set 286. Planetary gear set 280 allows engine 10 to rotate at a speed that is different from wheel speed and motor speed. There does not have to be a fixed ratio speed difference between engine 10 and wheels 216 or motor 286. Rather, engine speed may be adjusted to a speed that is independent of wheel speed by adjusting a torque of generator 288. For example, engine speed may be varied with speed of wheels 216, engine speed may be varied while wheel speed is constant, or engine speed may be held constant while speed of wheels 216 varies.

In response to a request to decelerate the vehicle and provide engine compression braking, vehicle system controller may cease or reduce an amount of fuel injected to engine 10 and request an engine speed-to-vehicle speed as prescribed by one of a plurality of engine speed-to-vehicle speed profiles, as shown in FIG. 3 (and described further below). The engine compression braking request may be provided in response to brake pedal position, or a driver demanded deceleration power, and a battery charge power limit of the energy storage device 285. The battery charge power limit may refer to an amount of charge the energy storage device (e.g., battery) may currently be able to accept. For example, when the battery charge level is 75% of the maximum state of charge, then the battery charge power limit may be more limited (smaller) than when the battery charge level is 50% of the maximum state of charge. The compression braking power request may be a difference between the driver demanded deceleration power and the battery charge power limit.

Referring now to FIG. 3, an example plot 300 of a plurality of engine speed-to-vehicle speed profiles for operating a CVT to control engine compression braking is shown. Vertical lines at VS1 and VS2 represent vehicle speeds at which one or more of the engine speed-to-vehicle speed profiles provides constant engine speed as vehicle speed increases. The engine speed-to-vehicle speed profiles (e.g., engine compression braking profiles) shown in FIG. 3 may be stored in non-transitory memory of one or more controllers shown in the system of FIGS. 1 and 2. Further, one or more of the engine speed-to-vehicle speed profiles shown in FIG. 3 may be the basis for operating a CVT, as described further below with reference to the method presented at FIG. 4.

The plot 300 of FIG. 3 includes a vertical axis that represents engine speed and a horizontal axis that represents vehicle speed. Each of the engine speed-to-vehicle speed profiles 302, 304, 306, and 308 provide a different level of engine braking. Profile 308 provides a lower level of engine braking as compared to profiles 306, 304, and 302. Profile 302 provides a highest level of engine braking. In one embodiment, each profile may be calibrated as a different fixed gear ratio (target speed/vehicle speed=constant for each point, denoted by an X, shown in the table), or they may have some other shape than as shown.

Depending on vehicle operating conditions, a vehicle may provide engine compression braking according to profile 308 and then increase engine compression braking according to profiles 306, 304, and 302. In one embodiment, upon initial entry into engine compression braking, the lowest engine compression braking profile (profile 308) may be initially selected and the engine speed command may be determined based on profile 308 and the current vehicle speed. Thus, as an example, if the current vehicle speed upon entry (e.g., start) into engine compression braking is about 50 Kph, then the commanded engine speed to provide the requested compression braking may be approximately 180 rad/sec. However, as described further below, the engine speed commanded according to the currently selected engine compression braking profile may not deliver the driver demanded deceleration power (e.g., wheel power demand or wheel torque request). Thus, as described further below with reference to FIGS. 4-6, the selected engine compression braking profile may be changed based on a changing power-based target engine speed which is based on wheel power demand and battery charge power limit.

It should be noted that although FIG. 3 shows four example engine speed-to-vehicle speed profiles, a fewer or greater number of engine speed-to-vehicle speed profiles may be provided. In addition, engine speed-to-vehicle speed profiles need not necessarily follow the shapes of profiles shown in FIG. 3. For example, engine speed-to-vehicle speed profiles may follow an exponential trajectory.

Figure 4:
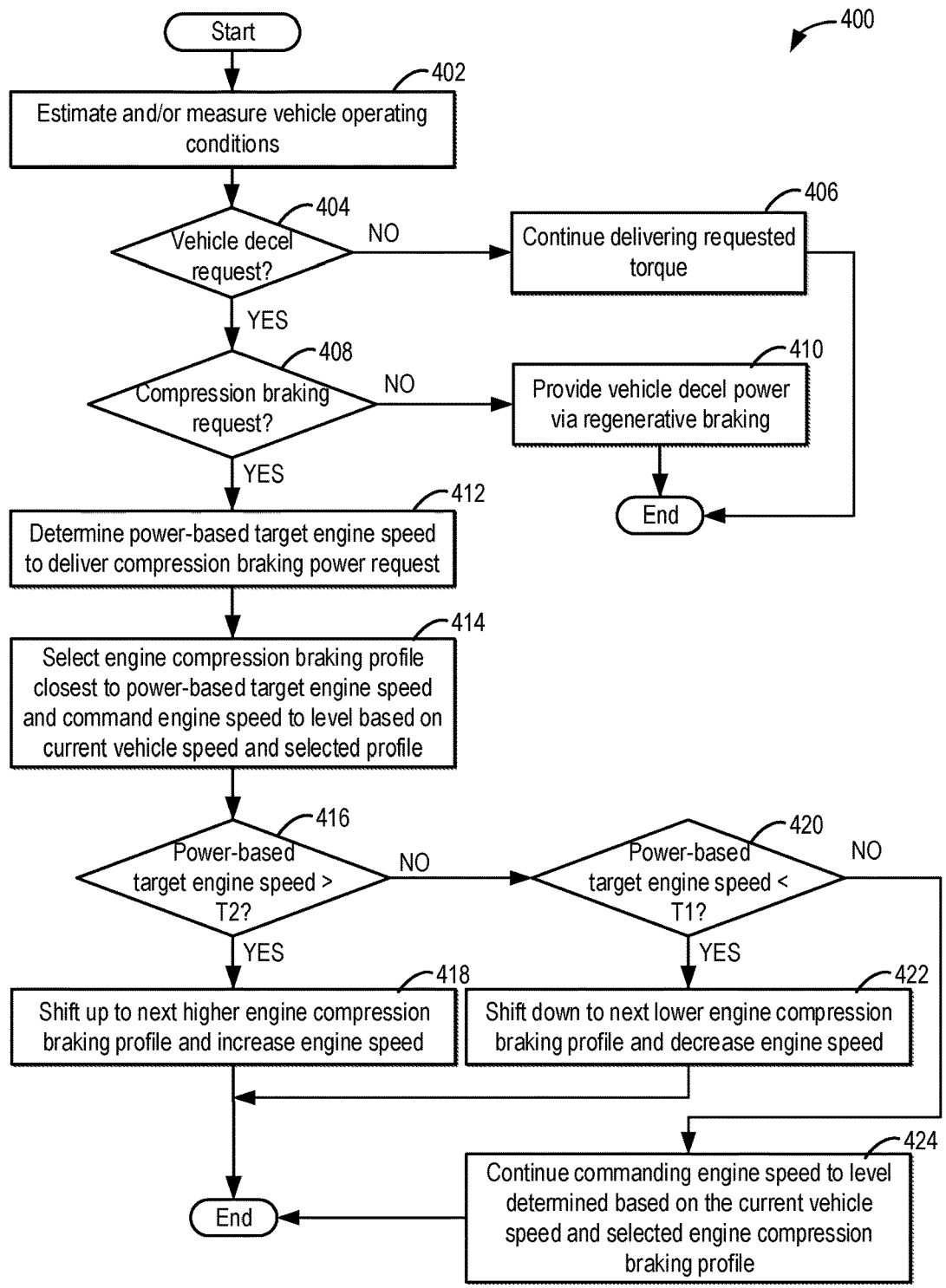
FIG. 4 shows a flow chart of an example method for operating a CVT to adjust engine speed during compression braking according to a selected engine speed-to-vehicle speed (compression braking) profile.

Turning to FIG. 4, a flow chart of a method 400 for operating a CVT to adjust engine speed according to a selected engine speed-to-vehicle speed profile is shown. In one example, the CVT may be similar to the CVT shown in FIG. 2 and may be part of a driveline of a hybrid vehicle, such as the vehicle shown in FIG. 1. Instructions for carrying out method 400 may be executed by a controller (e.g., controller 12 shown in FIGS. 1 and 2) based on instructions stored on a memory of the controller and in conjunction with signals received from sensors of the vehicle system, such as the sensors described above with reference to FIG. 1. The controller may employ engine actuators of the vehicle system to adjust vehicle operation, according to the methods described below.

Method 400 begins at 402 by estimating and/or measuring vehicle operating conditions. Vehicle operating conditions may include engine speed and/or load, vehicle speed, brake pedal position, accelerator pedal position, engine speed, mass air flow, fuel injection amount and/or timing, a current battery charge level of the energy storage device, a battery charge power limit of the energy storage device (e.g., an energy storage capacity of the battery, including how much charge the energy storage device (e.g., battery) may currently be able to accept), etc.

At 404, the method includes determining whether there is a vehicle deceleration request. The vehicle deceleration request may be determined by the controller based on signals received from the brake pedal (e.g., brake pedal position) and/or accelerator pedal (e.g., accelerator pedal position). For example, vehicle deceleration may be requested in response to a driver releasing the accelerator pedal or requesting less than a threshold amount of torque from the driveline. If there is no request for deceleration of the vehicle, the method continues to 406 to continue delivering the requested torque and continuing current operation of the vehicle. Alternatively, if there is a vehicle deceleration request, the method continues to 408 to determine whether the vehicle deceleration request includes a request for engine compression braking. As one example, upon receiving a request for vehicle deceleration, regenerative braking may initially be used to maintain the vehicle speed at the demanded level (via utilizing negative motor torque). However, there may be insufficient regenerative braking capacity to maintain the desired deceleration vehicle speed due to the energy storage device (e.g., energy storage device, or battery, 285 shown in FIG. 2) not being able to accept additional power (generated via regenerative braking). For example, if the battery charge power limit is low or below a lower threshold level, the demanded vehicle deceleration torque may not be able to be delivered via regenerative braking, and thus, compression braking may be required in order to dissipate energy and provide the requested negative wheel torque during the deceleration event. As the battery state of charge increases, the battery charge power limit decreases. In one example, the lower threshold level may be a non-zero threshold. In another example, the lower threshold level may be zero such that no more power may be accepted by the battery for producing the demanded negative wheel torque. Thus, the determination at 408 may include determining whether the battery (e.g., energy storage device) is able to accept the power for producing the demanded negative wheel torque to meet the negative driver demand for deceleration. For example, the method at 408 may include determining if the battery charge power limit is below a lower threshold level, where the lower threshold level may be a non-zero value that is based on the driver demanded negative wheel torque (e.g., wheel power demand). If the battery is able to accept the power required for decelerating the vehicle, as demanded by the vehicle operator, the method may continue to 410 to provide the vehicle deceleration power via regenerative braking. Otherwise, the method continues from 408 to 412.

At 412, the method includes determining a power-based target engine speed to deliver the (engine) compression braking power request. The compression braking power request may be an estimate of how much power must be dissipated through the engine/generator to fulfil the deceleration request, and may be determined based on a difference between the driver demanded deceleration power (e.g., total deceleration power, including negative wheel torque, to meet the requested vehicle deceleration request) and the battery charge power limit. During compression braking, engine fueling may be disabled, and the generator (e.g., generator 288 shown in FIG. 2) spins the engine and the power consumed by the generator depends on the engine speed achieved and the engine friction and pumping losses (which vary based on engine speed, among other factors). The power consumed by the generator diverts a portion of the traction motor regenerative power from the battery, thereby reducing the level of battery charging. The target engine speed during compression braking (referred to herein as the power-based target engine speed) may be determined based on the amount of compression braking needed (e.g., the wheel power demand (or demanded negative wheel torque)—battery charge power limit) and a map of unfueled engine power as a function of speed. While in compression braking, the power-based target engine speed varies continuously with wheel power demand (wheel torque request) and the battery charge power limit. Thus, the power-based target engine speed may be continuously updated (or updated at preset intervals) during the deceleration event as the wheel power demand and/or battery charge power limit changes. Further, it should be noted that the power-based target engine speed is disconnected with vehicle speed.

The method continues to 414 to select an engine compression braking profile closest to the determined power-based target engine speed and command engine speed to a level that is determined based on the current vehicle speed and the selected profile. As described above with reference to FIG. 3, a plurality of engine compression braking profiles, which include relationships between engine speed and vehicle speed, may be stored in memory of the controller. There may be a finite number of these profiles stored at the memory of the controller (e.g., four as shown in FIG. 3, or more or less than four in other embodiments). In one embodiment, the method at 414 may include comparing the power-based target engine speed determined at 412 to the stored engine compression braking profiles and selecting the profile for which the power-based target engine speed most closely matches the engine speed for the current vehicle speed. In another embodiment, if the method has just entered compression braking (e.g., no previous compression braking profile was selected), the method at 414 may include selecting the lowest compression braking profile (the profile that provides the lowest engine speed at each vehicle speed, e.g., profile 308 in FIG. 3). The method at 414 then includes determining the engine speed for the current vehicle speed, using the selected engine compression braking profile. The controller may then command engine speed to the level determined from the selected engine compression braking profile. This may include adjusting engine speed to the commanded engine speed determined from the selected profile. Adjusting engine speed to the commanded engine speed may include the controller sending a control signal to an actuator of the generator of the CVT to adjust torque of the generator, thereby adjusting the engine speed to the commanded level.

Since there are a finite number of engine compression braking profiles, and the power-based target engine speed may vary continuously with the driver demanded wheel power and battery charge power limit during the deceleration event, the commanded engine speed may be too low (or too high) to deliver the requested compression braking power. As a result, the delivered wheel power (and torque) may be less (or more) than the driver demand, and the vehicle may travel at a different speed than desired (e.g., accelerate downhill). Thus, method at 416 and 420 (as described in further detail below) may include comparing the power-based target engine speed (which may be continuously updated, as described above) to the engine speed specified by the currently selected compression braking profile at the current vehicle speed, and the engine speed specified by the next higher and lower compression braking profiles. Specifically, the methods at 416 and 420 may include comparing the currently determined, power-based target engine speed to upper and lower threshold engine speed levels for shifting the selected profile to the next highest or next lowest, respectively, compression braking profiles and adjusting the engine speed accordingly. In some examples, the methods at 416 and 420 may additionally include determining whether a threshold time period (or duration) since a previous shift between compression braking profiles has been reached? For example, shifts between compression braking profiles may only be allowed after the threshold time period or duration has passed, in order to limit how quickly the engine speed levels shift up or down. In some embodiments, the threshold time period may be set to 0 in order to allow almost instantaneous switching between profiles.

Figure 5:
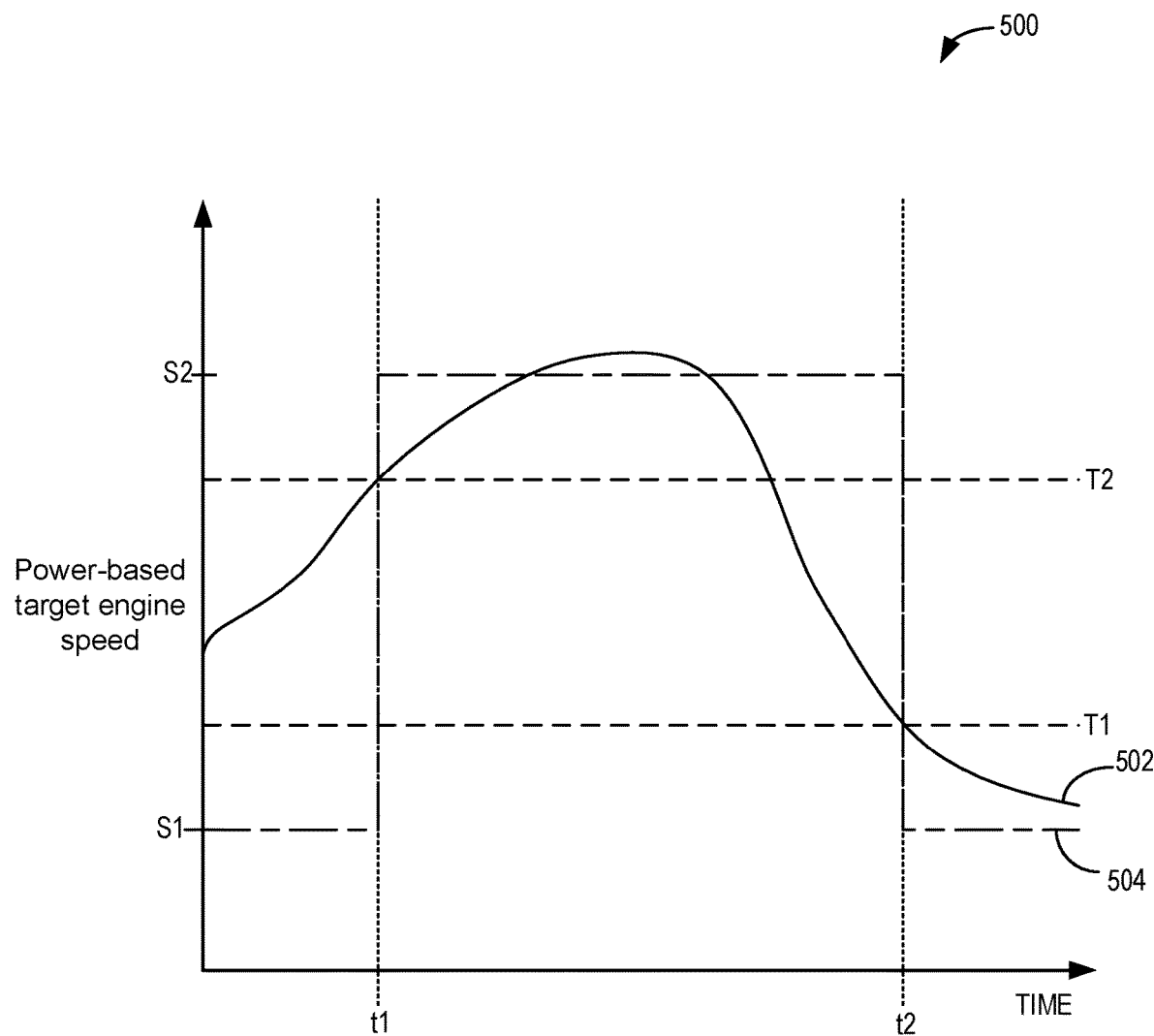
FIG. 5 shows an example graph of power-based target engine speed vs. time depicting an example for changing the selected compression braking profile for controlling the engine speed.

Turning to FIG. 5, a graph 500 of power-based target engine speed vs. time depicting an example for changing the selected compression braking profile for controlling the engine speed is shown. Specifically, graph 500 shows changes in the determined power-based target engine speed at plot 502 and changes in the commanded engine speed (as specified by the selected compression braking profile) at plot 504. Graph 500 also shows a lower, first threshold T1 for shifting the commanded engine speed down to a lower, first engine speed (S1) specified by a first compression braking profile (such as profile 308 shown in FIG. 3), and second threshold T2 for shifting the commanded engine speed up to a higher, second engine speed (S2) specified by a second compression braking profile (such as profile 306 shown in FIG. 3). In one example, the thresholds T1 and T2 may be different, non-zero thresholds that are specified by calibratable percentages of the difference between the two adjacent engine speed levels (specified by the two adjacent compression braking profiles). As one example, T2 may be S1+0.9*(S2−S1) and T1 may be S1+0.1*(S2−S1). As another example, T2 may equal S2 while T1 equals S1. As shown by FIG. 5, prior to time t1 the commanded engine speed (plot 504) is at the lower, first engine speed S1 (specified by the lower compression braking profile) and the determined power-based target engine speed (plot 502) is increasing farther above the first engine speed S1. At time t1, the power-based target engine speed increases above the second threshold T2. As a result, the selected compression braking profile is switched to the higher, second compression braking profile and the commanded engine speed (plot 504) is shifted up to the higher, second engine speed S2 specified by the current vehicle speed and the second compression braking profile. After time t1, the determined power-based target engine speed (plot 502) continues to increase, slightly overshoots the commanded engine speed, and then begins to decrease below the commanded engine speed. At time t2, the power-based target engine speed decreases below the first threshold T1. As a result, the selected compression braking profile is switched to the lower, first compression braking profile and the commanded engine speed (plot 504) is shifted down to the lower, first engine speed S1 specified by the current vehicle speed and the first compression braking profile. In this way, the selected compression braking profile for controlling the CVT to adjust engine speed is changed based on the power-based target engine speed relative to predetermined thresholds, where the power-based target engine speed continuously varies with driver demanded power (wheel torque request) and a battery charge power limit of the vehicle.

Returning to FIG. 4, at 416, the method includes determining whether the power-based target engine speed is greater than an upper threshold T2. As explained above with reference to FIG. 5, the upper threshold T2 may be a non-zero threshold that is determined based on a percentage of a difference between the engine speeds specified by the two adjacent compression braking profiles. In this way, the upper threshold T2 may be lower than the engine speed specified by the next, higher (relative to the currently selected) compression braking profile and closer to the engine speed specified by the next, higher compression braking profile than the engine speed specified by the currently selected compression braking profile. If the power-based target engine speed is greater than the upper threshold T2, the method continues to 418 to shift the compression braking profile up to the next higher engine compression braking profile and increase engine speed to the engine speed level specified by the new, higher engine compression braking profile at the current vehicle speed. The method at 418 may include the controller sending a control signal to the actuator of the generator to increase engine speed to the increased engine speed level.

Alternatively, if the power-based target engine speed is not greater than the upper threshold T2, the method continues to 420 to determine whether the power-based target engine speed is less than a lower threshold T1. As explained above with reference to FIG. 5, the lower threshold T1 may be a non-zero threshold that is determined based on a percentage of a difference between the engine speeds specified by the two adjacent compression braking profiles. In this way, the lower threshold T1 may be higher than the engine speed specified by the next, lower (relative to the currently selected) compression braking profile and closer to the engine speed specified by the next, lower compression braking profile than the engine speed specified by the currently selected compression braking profile. If the power-based target engine speed is less than the lower threshold T1, the method continues to 422 to shift the compression braking profile down to the next lower engine compression braking profile and decrease engine speed to the engine speed level specified by the new, lower engine compression braking profile at the current vehicle speed. The method at 422 may include the controller sending a control signal to the actuator of the generator to decrease engine speed to the increased engine speed level. After the methods at 418 and 422, the method then ends. However, method 400 may continuously repeat in order to continue changing the selected compression braking profiles based on the changing power-based target engine speed and adjusting engine speed accordingly.

Alternatively at 420, if the power-based target engine speed is not less than the lower threshold T1, the method continues to 424 to continue commanded engine speed to the level determined based on the current vehicle speed and the currently selected engine compression braking profile. Thus, the method at 424 may include not changing the selected engine compression braking profile to the next higher or lower profile and instead continue commanding engine speed to the level that is specified by the currently selected engine speed, for the current vehicle speed. The method then ends.

Figure 6:
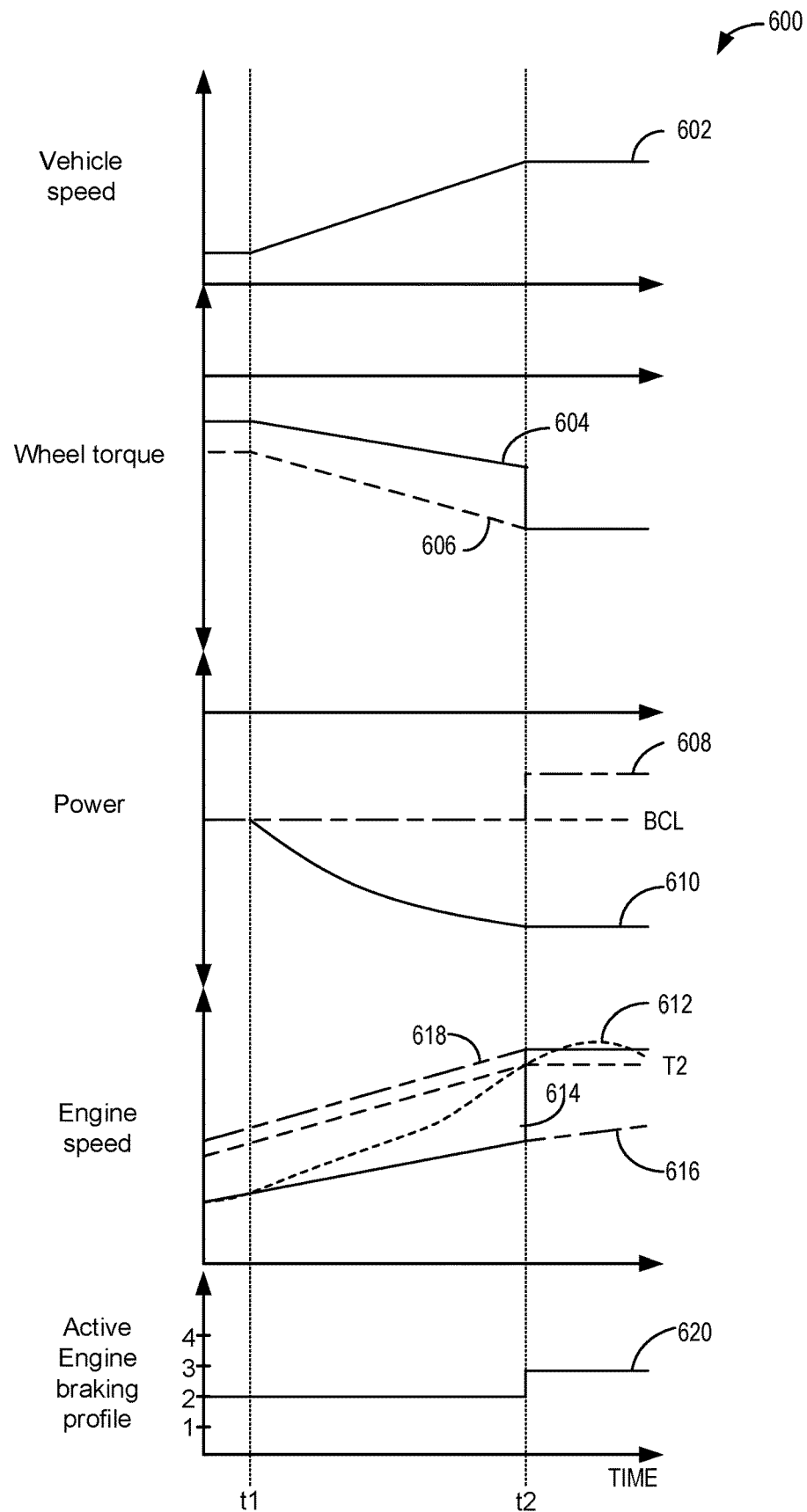
FIG. 6 shows a prophetic operating sequence for operating a CVT to adjust engine speed during compression braking according to a selected engine speed-to-vehicle speed profile.

Continuing to FIG. 6, a graph 600 depicting a prophetic operating sequence for operating a CVT to adjust engine speed during compression braking according to a selected engine speed-to-vehicle speed profile is shown. Specifically, graph 600 shows changes in vehicle speed at plot 602, changes in delivered wheel torque at plot 604, changes in demanded wheel torque at plot 606, changes in an actual battery power level at plot 608 relative to a battery charge power limit BCL, changes in driver demanded power at plot 610, changes in power-based target engine speed at plot 612, changes in commanded engine speed at plot 614, changes in a first engine speed specified by a lower, second engine speed-to-vehicle speed (compression braking) profile (as a function of vehicle speed) at plot 616, changes in a second engine speed specified by a higher, third engine speed-to-vehicle speed (compression braking) profile (as a function of vehicle speed) at plot 618, and changes in the selected (active) compression braking profile at plot 620.

Prior to time t1, the selected compression braking profile is the second profile (plot 602) and the engine speed is adjusted, as a function of vehicle speed, according to the second profile. At time t1, the power-based target engine speed (plot 612) begins increasing relative to the commanded engine speed (plot 614). For example, between time t1 and time t2, the compression braking level is too low to deliver the requested compression braking power. Specifically, the delivered wheel torque (plot 604) is less than the driver demanded wheel torque (plot 606) because the battery power (plot 608) is being limited by the battery charge power limit BCL. Since there is insufficient deceleration torque (delivered wheel torque), the vehicle accelerates downhill, as shown by the increasing vehicle speed (plot 602). Since the vehicle speed is increasing between time t1 and time t2, the driver demanded power (plot 610) increases with a constant wheel torque demand. The driver (or cruise control vehicle speed controller) may also begin to request more negative wheel torque (plot 606), or greater deceleration. As the amount of compression braking power needed grows, the power-based target engine speed also increases (plot 612). At time t1, the power-based target engine speed increases above the upper threshold T2 for shifting to the next, higher level. As a result, the commanded engine speed shifts up to the next, higher level (plot 614 shifts from lower speed 616 to higher speed 618 at time t2). This increase in engine speed increases the amount of compression braking power delivered, and the delivered wheel torque (power) may no longer be constrained by the battery charge power limit. As shown after time t2, the delivered wheel torque (plot 604) drops to the requested wheel torque (plot 606).

In this way, during deceleration events where requested negative wheel torque (deceleration torque) cannot be delivered by alternative methods (e.g., regenerative braking), compression braking may be used to dissipate energy and decelerate the vehicle and a CVT may be operated to adjust engine speed according to a selected engine speed-to-vehicle speed profile (referred to herein as an engine compression braking or compression braking profile). The compression braking profile may specify an engine speed for providing the desired compression braking as a function of vehicle speed. The compression braking profile may be selected from a plurality of stored profiles based on a power-based target engine speed. The power-based target engine speed may vary based on the driver demanded power for deceleration (demanded negative wheel torque) and a battery charge power limit of a battery of the hybrid vehicle. For example, the commanded engine speed for the currently selected compression braking profile may not provide the driver demanded deceleration power. As a result, the demanded negative wheel torque may increase, thereby increasing the power-based target engine speed. The compression braking profile may be changed to the next, higher level, thereby commanded a higher engine speed, in response to the power-based target engine speed increasing over a determined threshold. As a result, the engine speed may adjusted to deliver the demanded deceleration torque. A technical effect of operating a continuously variable transition (CVT) via a controller to adjust engine speed according to an engine speed-to-vehicle speed profile selected based on a power-based target engine speed for the compression braking request in response to a request for engine compression braking of a vehicle, the power-based target engine speed varying continuously with driver demanded power and a battery charge power limit of the vehicle, is delivering the driver demanded power for the compression braking request while also reducing NVH. Further, by selecting (or shifting between) the engine speed-to-vehicle speed profiles based on the power-based target engine speed, which varies with and is determined based on the driver demanded power, shifting between profiles to deliver the driver demanded power for compression braking request may always be possible, under all vehicle operating modes (and not just during grade assist or cruise control modes), and even if the accelerator pedal is depressed, thereby providing increased flexibility in operation.

As one embodiment, a method includes, in response to a request for engine compression braking of a vehicle, operating a continuously variable transition (CVT) via a controller to adjust engine speed according to an engine speed-to-vehicle speed profile selected based on a power-based target engine speed for the compression braking request, the power-based target engine speed varying continuously with driver demanded deceleration power and a battery charge power limit of the vehicle. In a first example of the method, operating the CVT via the controller to adjust engine speed according to the selected engine speed-to-vehicle speed profile includes commanding engine speed to a level determined from the selected engine speed-to-vehicle speed profile as a function of current vehicle speed. A second example of the method optionally includes the first example and further includes, wherein the driver demanded deceleration power includes a negative wheel power demand and the power-based target engine speed is determined based on the negative wheel power demand during the request for engine compression braking and the battery charge power limit of a battery of the vehicle, where the vehicle is a hybrid vehicle. A third example of the method optionally includes one or more of the first and second examples, and further includes, wherein the engine speed-to-vehicle speed profile is a first engine speed-to-vehicle speed profile selected from a plurality of engine speed-to-vehicle speed profiles stored in a memory of the controller. A fourth example of the method optionally includes one or more of the first through third examples and further includes, wherein the first engine speed-to-vehicle speed profile is a lowest engine speed-to-vehicle speed profile out of the plurality of engine speed-to-vehicle speed profiles and further comprising selecting the first engine speed-to-vehicle speed profile at a start of engine compression braking, after receiving the request for engine compression braking. A fifth example of the method optionally includes one or more of the first through fourth examples and further includes changing the selected engine speed-to-vehicle speed profile from the first engine speed-to-vehicle speed profile to a higher, second engine speed-to-vehicle speed profile of the plurality of engine speed-to-vehicle speed profiles in response to the power-based target engine speed increasing above an upper threshold, the upper threshold determined based on a percentage of a difference between a second engine speed specified according to the second engine speed-to-vehicle speed profile for a current vehicle speed and a first engine speed specified according to the first engine speed-to-vehicle speed profile for the current vehicle speed. A sixth example of the method optionally includes one or more of the first through fifth examples and further includes increasing engine speed from the first engine speed to the second engine speed in response to changing the selected engine speed-to-vehicle speed profile and continuing to adjust engine speed to a level specified by the second engine speed-to-vehicle speed profile as the current vehicle speed changes. A seventh example of the method optionally includes one or more of the first through sixth examples and further includes selecting the first engine speed-to-vehicle speed profile, based on the power-based target engine speed, in response to an engine speed specified by the first engine speed-to-vehicle speed profile for a current vehicle speed most closely matching the power-based target engine speed relative to engine speeds specified by remaining engine speed-to-vehicle speed profiles of the plurality of engine speed-to-vehicle speed profiles. An eighth example of the method optionally includes one or more of the first through seventh examples and further includes changing the selected engine speed-to-vehicle speed profile from the first engine speed-to-vehicle speed profile to a second engine speed-to-vehicle speed profile of the plurality of engine speed-to-vehicle speed profiles in response to the power-based target engine speed increasing above an upper threshold or decreasing below a lower threshold, the upper threshold and the lower threshold determined based on a difference between a second engine speed specified according to the second engine speed-to-vehicle speed profile for a current vehicle speed and a first engine speed specified according to the first engine speed-to-vehicle speed profile for the current vehicle speed, the upper threshold and lower threshold being different and both at levels between the first engine speed and second engine speed. A ninth example of the method optionally includes one or more of the first through eighth examples and further includes, wherein the request for engine compression braking is generated in response to a battery of the vehicle not being able to accept power for producing a negative wheel torque to meet the driver demanded deceleration power for a deceleration event.

As another embodiment, a method includes during a vehicle deceleration event where requested deceleration torque cannot be delivered via negative motor torque: operating a continuously variable transmission (CVT) via a controller to adjust engine speed according to a first engine speed-to-vehicle speed profile in response to a request for engine compression braking; and changing operating the CVT via the controller to adjust engine speed according to a second engine speed-to-vehicle speed profile in response to a change in wheel torque request that increases or decreases a power-based target engine speed above or below respective thresholds. In a first example of the method, the power-based target engine speed is a target engine speed for delivering a compression braking power request, the compression braking power request based on the wheel torque request and a battery charge power limit of a battery of a hybrid vehicle. A second example of the method optionally includes the first example and further includes, wherein operating the CVT via the controller to adjust engine speed according to the first engine speed-to-vehicle speed profile includes adjusting engine speed to a level determined from the first engine speed-to-vehicle speed profile for a current vehicle speed and continuing to adjust the engine speed according to the first engine speed-to-vehicle speed profile as vehicle speed changes. A third example of the method optionally includes one or more of the first and second examples and further includes, wherein the respective thresholds are determined based on a percentage of an absolute value of a difference between a first engine speed specified by the first engine speed-to-vehicle speed profile at a current vehicle speed and a second engine speed specified by the second engine speed-to-vehicle speed profile at the current vehicle speed. A fourth example of the method optionally includes one or more of the first through third examples and further includes, wherein changing operating the CVT includes changing operating the CVT via the controller to the adjust engine speed to the second engine speed in response to the power-based target engine speed increasing above an upper threshold, the second engine speed being higher than the first engine speed and the upper threshold being closer to the second engine speed than the first engine speed. A fifth example of the method optionally includes one or more of the first through fourth examples and further includes, wherein changing operating the CVT includes changing operating the CVT via the controller to the adjust engine speed to the second engine speed in response to the power-based target engine speed decreasing below a lower threshold, the first engine speed being higher than the second engine speed and the lower threshold being closer to the second engine speed than the first engine speed.

As yet another embodiment, a system for a hybrid vehicle includes: a continuously variable transmission (CVT); a battery coupled to a motor of the hybrid vehicle; a controller with computer readable instructions stored on non-transitory memory that when executed during a deceleration event of the hybrid vehicle, cause the controller to: operate the CVT to adjust engine speed to a first level determined based on a current vehicle speed and a first engine compression braking profile of engine speed vs. vehicle speed; determine a power-based target engine speed to deliver a compression braking power request based on a difference between a driver demanded deceleration power for the compression braking power request and a battery charge power limit of the battery; and in response to the determined power-based target engine speed increasing above a first threshold based on engine speeds specified by the first engine compression braking profile and a higher, second engine compression braking profile, shift to the second engine compression braking profile and adjust engine speed to a second level determined based on the current vehicle speed and the second engine compression braking profile. In a first example of the system, the instructions further cause the controller to: in response to the determined power-based target engine speed decreasing below a second threshold based on engine speeds specified by the first engine compression braking profile and a lower, third engine compression braking profile, shift to the third engine compression braking profile and adjust engine speed to a third level determined based on the current vehicle speed and the third engine compression braking profile. A second example of the system optionally includes the first example and further includes, wherein the instructions further cause the controller to: in response to the determined power-based target engine speed increasing above a fourth threshold based on engine speeds specified by the second engine compression braking profile and a higher, further engine compression braking profile, shift to the fourth engine compression braking profile and adjust engine speed to a fourth level based on the current vehicle speed and the fourth engine compression braking profile. A third example of the system optionally includes one or more of the first and second examples and further includes, wherein operating the CVT to adjust engine speed to the first level and adjusting engine speed to the second level is responsive to and occurs during a compression braking condition where a requested deceleration torque cannot be delivered via negative motor torque of the motor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
in response to a request for engine compression braking of a vehicle, operating a continuously variable transition (CVT) via a controller to adjust engine speed according to an engine speed-to-vehicle speed profile selected based on a power-based target engine speed for the compression braking request, the power-based target engine speed varying continuously with driver demanded deceleration power and a battery charge power limit of the vehicle.

2. The method of claim 1, wherein operating the CVT via the controller to adjust engine speed according to the selected engine speed-to-vehicle speed profile includes commanding engine speed to a level determined from the selected engine speed-to-vehicle speed profile as a function of current vehicle speed.

3. The method of claim 1, wherein the driver demanded deceleration power includes a negative wheel power demand and the power-based target engine speed is determined based on the negative wheel power demand during the request for engine compression braking and the battery charge power limit of a battery of the vehicle, where the vehicle is a hybrid vehicle.

4. The method of claim 1, wherein the engine speed-to-vehicle speed profile is a first engine speed-to-vehicle speed profile selected from a plurality of engine speed-to-vehicle speed profiles stored in a memory of the controller.

5. The method of claim 4, wherein the first engine speed-to-vehicle speed profile is a lowest engine speed-to-vehicle speed profile out of the plurality of engine speed-to-vehicle speed profiles and further comprising selecting the first engine speed-to-vehicle speed profile at a start of engine compression braking, after receiving the request for engine compression braking.

6. The method of claim 5, further comprising changing the selected engine speed-to-vehicle speed profile from the first engine speed-to-vehicle speed profile to a higher, second engine speed-to-vehicle speed profile of the plurality of engine speed-to-vehicle speed profiles in response to the power-based target engine speed increasing above an upper threshold, the upper threshold determined based on a percentage of a difference between a second engine speed specified according to the second engine speed-to-vehicle speed profile for a current vehicle speed and a first engine speed specified according to the first engine speed-to-vehicle speed profile for the current vehicle speed.

7. The method of claim 6, further comprising increasing engine speed from the first engine speed to the second engine speed in response to changing the selected engine speed-to-vehicle speed profile and continuing to adjust engine speed to a level specified by the second engine speed-to-vehicle speed profile as the current vehicle speed changes.

8. The method of claim 4, further comprising selecting the first engine speed-to-vehicle speed profile, based on the power-based target engine speed, in response to an engine speed specified by the first engine speed-to-vehicle speed profile for a current vehicle speed most closely matching the power-based target engine speed relative to engine speeds specified by remaining engine speed-to-vehicle speed profiles of the plurality of engine speed-to-vehicle speed profiles.

9. The method of claim 8, further comprising changing the selected engine speed-to-vehicle speed profile from the first engine speed-to-vehicle speed profile to a second engine speed-to-vehicle speed profile of the plurality of engine speed-to-vehicle speed profiles in response to the power-based target engine speed increasing above an upper threshold or decreasing below a lower threshold, the upper threshold and the lower threshold determined based on a difference between a second engine speed specified according to the second engine speed-to-vehicle speed profile for a current vehicle speed and a first engine speed specified according to the first engine speed-to-vehicle speed profile for the current vehicle speed, the upper threshold and lower threshold being different and both at levels between the first engine speed and second engine speed.

10. The method of claim 1, wherein the request for engine compression braking is generated in response to a battery of the vehicle not being able to accept power for producing a negative wheel torque to meet the driver demanded deceleration power for a deceleration event.

11. A method, comprising:
during a vehicle deceleration event where requested deceleration torque cannot be delivered via negative motor torque:
operating a continuously variable transmission (CVT) via a controller to adjust engine speed according to a first engine speed-to-vehicle speed profile in response to a request for engine compression braking; and
changing operating the CVT via the controller to adjust engine speed according to a second engine speed-to-vehicle speed profile in response to a change in wheel torque request that increases or decreases a power-based target engine speed above or below respective thresholds.

12. The method of claim 11, wherein the power-based target engine speed is a target engine speed for delivering a compression braking power request, the compression braking power request based on the wheel torque request and a battery charge power limit of a battery of a hybrid vehicle.

13. The method of claim 11, wherein operating the CVT via the controller to adjust engine speed according to the first engine speed-to-vehicle speed profile includes adjusting engine speed to a level determined from the first engine speed-to-vehicle speed profile for a current vehicle speed and continuing to adjust the engine speed according to the first engine speed-to-vehicle speed profile as vehicle speed changes.

14. The method of claim 11, wherein the respective thresholds are determined based on a percentage of an absolute value of a difference between a first engine speed specified by the first engine speed-to-vehicle speed profile at a current vehicle speed and a second engine speed specified by the second engine speed-to-vehicle speed profile at the current vehicle speed.

15. The method of claim 14, wherein changing operating the CVT includes changing operating the CVT via the controller to the adjust engine speed to the second engine speed in response to the power-based target engine speed increasing above an upper threshold, the second engine speed being higher than the first engine speed and the upper threshold being closer to the second engine speed than the first engine speed.

16. The method of claim 14, wherein changing operating the CVT includes changing operating the CVT via the controller to the adjust engine speed to the second engine speed in response to the power-based target engine speed decreasing below a lower threshold, the first engine speed being higher than the second engine speed and the lower threshold being closer to the second engine speed than the first engine speed.

17. A system for a hybrid vehicle, comprising:
a continuously variable transmission (CVT);
a battery coupled to a motor of the hybrid vehicle;
a controller with computer readable instructions stored on non-transitory memory that when executed during a deceleration event of the hybrid vehicle, cause the controller to:
  operate the CVT to adjust engine speed to a first level determined based on a current vehicle speed and a first engine compression braking profile of engine speed vs. vehicle speed;
  determine a power-based target engine speed to deliver a compression braking power request based on a difference between a driver demanded deceleration power for the compression braking power request and a battery charge power limit of the battery; and
  in response to the determined power-based target engine speed increasing above a first threshold based on engine speeds specified by the first engine compression braking profile and a higher, second engine compression braking profile, shift to the second engine compression braking profile and adjust engine speed to a second level determined based on the current vehicle speed and the second engine compression braking profile.

18. The system of claim 17, wherein the instructions further cause the controller to: in response to the determined power-based target engine speed decreasing below a second threshold based on engine speeds specified by the first engine compression braking profile and a lower, third engine compression braking profile, shift to the third engine compression braking profile and adjust engine speed to a third level determined based on the current vehicle speed and the third engine compression braking profile.

19. The system of claim 17, wherein the instructions further cause the controller to: in response to the determined power-based target engine speed increasing above a fourth threshold based on engine speeds specified by the second engine compression braking profile and a higher, further engine compression braking profile, shift to the fourth engine compression braking profile and adjust engine speed to a fourth level based on the current vehicle speed and the fourth engine compression braking profile.

20. The system of claim 17, wherein operating the CVT to adjust engine speed to the first level and adjusting engine speed to the second level is responsive to and occurs during a compression braking condition where a requested deceleration torque cannot be delivered via negative motor torque of the motor.

* * * * *